(12) United States Patent
Lin

(10) Patent No.: US 6,259,362 B1
(45) Date of Patent: Jul. 10, 2001

(54) SYSTEM FOR CONVEYING VEHICLE STATUS INFORMATION UPON EXIT FROM A VEHICLE

(75) Inventor: Xing Ping Lin, Waterford, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/400,227

(22) Filed: Sep. 21, 1999

(51) Int. Cl.$^7$ ............................. B60Q 1/00; G08C 19/00
(52) U.S. Cl. .................... 340/457; 340/425.5; 340/438; 340/439; 340/539; 340/825.69; 340/825.72; 307/10.1; 307/10.2; 361/171; 361/172; 701/29
(58) Field of Search .................................. 340/457, 459, 340/425, 438, 439, 539, 825.69, 825.72; 307/10.1–10.4; 455/575, 95, 99; 361/171, 172; 701/29, 30

(56) References Cited

U.S. PATENT DOCUMENTS

| | | | |
|---|---|---|---|
| 3,703,714 | * 11/1972 | Andrews | 340/539 |
| 5,463,374 | 10/1995 | Mendez et al. | 340/442 |
| 5,483,826 | 1/1996 | Schultz et al. | 73/146.5 |
| 5,500,637 | 3/1996 | Kokubu | 340/825.69 |
| 5,561,331 | * 10/1996 | Suyama et al. | 340/825.69 |
| 5,602,524 | 2/1997 | Mock et al. | 340/447 |
| 6,107,914 | * 8/2000 | Greene | 340/426 |
| 6,127,922 | * 10/2000 | Roddy et al. | 340/426 |
| 6,130,622 | * 10/2000 | Hussey et al. | 340/825.31 |
| 6,154,658 | * 11/2000 | Caci | 455/99 |

* cited by examiner

Primary Examiner—Donnie L. Crosland
(74) Attorney, Agent, or Firm—Tarolli, Sundheim, Covell Tummino & Szabo L.L.P.

(57) ABSTRACT

A system (10) for a vehicle (12), wherein the system includes transmitter components (26, 28), located at the vehicle, that are operable to send communication that conveys a vehicle system status. A portable receiver unit (14) is operable to receive the communication that conveys the vehicle system status. An operator (76) of the vehicle (12) carries the portable receiver unit (14) upon leaving the vehicle. A controller (22) senses a condition indicative of the vehicle operator (76) leaving the vehicle (12) and enables the communication from the transmitter components (26, 28) to the portable receiver unit (14) in response to the sensed condition indicative of the vehicle operator (76) leaving the vehicle (12). Preferably, a device (44) enables operation of the portable receiver unit (14) in response to the sensed condition indicative of the vehicle operator (76) leaving the vehicle (12).

20 Claims, 3 Drawing Sheets

SYSTEM FOR CONVEYING VEHICLE STATUS INFORMATION UPON EXIT FROM A VEHICLE

FIELD OF INVENTION

The present invention relates to systems for conveying vehicle system status information to a vehicle operator, and is particularly directed a system in which the operator is provided the information at a location away from a vehicle.

BACKGROUND OF THE INVENTION

When a vehicle operator exits a vehicle, it is often beneficial for the operator to know the status of one or more vehicle systems. For example, it is useful for the operator to know whether a vehicle light (e.g., headlights or an interior light) is ON. Also, the status of vehicle tire pressure and vehicle fuel level are useful to the operator. Such information may help the vehicle operator avert an inconvenient or annoying situation when the vehicle operator returns to the vehicle.

It is known to provide a warning type notice to the vehicle operator for certain types of vehicle system conditions. For example, it is know to use an audible chime for such conditions as a vehicle light being ON when a vehicle door is opened. Another example is an audible chime or buzzer that sounds when an ignition key is left in a vehicle ignition when the door is opened.

Remote convenience systems for vehicles are known in the art. Such remote convenience systems remotely control one or more vehicle functions. An example of such a remotely controlled function is the locking and unlocking of one or more vehicle doors. A remote convenience vehicle system that permits remote locking and unlocking functions is commonly referred to as a remote keyless entry system.

Known remote convenience vehicle systems include a receiver unit mounted in an associated vehicle and a portable, hand-held transmitter unit located remote from the receiver unit. The portable unit is provided with one or more manually actuatable pushbutton switches. Each pushbutton switch is associated with a remote control vehicle function to be performed. Typically, the vehicle operator carries the portable unit on their person when they exit the vehicle.

SUMMARY OF THE INVENTION

In accordance with one aspect, the present invention provides a system for a vehicle. The system includes transmitter means, located at the vehicle, operable for sending communication that conveys a vehicle system status. Portable receiver means of the system is operable for receiving the communication that conveys the vehicle system status. An operator of the vehicle carries the receiver means upon leaving the vehicle. The system includes means for sensing a condition indicative of the operator leaving the vehicle. The system includes means for enabling the communication from the transmitter means to the receiver means in response to the sensed condition indicative of the vehicle operator leaving the vehicle.

In accordance with another aspect, the present invention provides a system that includes transmitter means, located at a vehicle, operable for transmitting a vehicle system status signal. Portable receiver means of the system receives the transmitted vehicle system status signal. An operator of the vehicle carries the receiver means upon leaving the vehicle. The system includes means for sensing a condition indicative of the vehicle operator leaving the vehicle. The system includes means for causing operation of the transmitter means in response to the sensed condition indicative of the vehicle operator leaving the vehicle.

In accordance with yet another aspect, the present invention provides a system that includes a transmitter means, located at a vehicle, operable for transmitting a vehicle system status signal. Portable receiver means of the system is operable for receiving the transmitted vehicle system status signal. An operator of the vehicle carries the receiver means upon leaving the vehicle. The system includes means for sensing a condition indicative of the operator leaving the vehicle. The system includes means for enabling operation of the receiver means in response to the sensed condition indicative of the vehicle operator leaving the vehicle.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
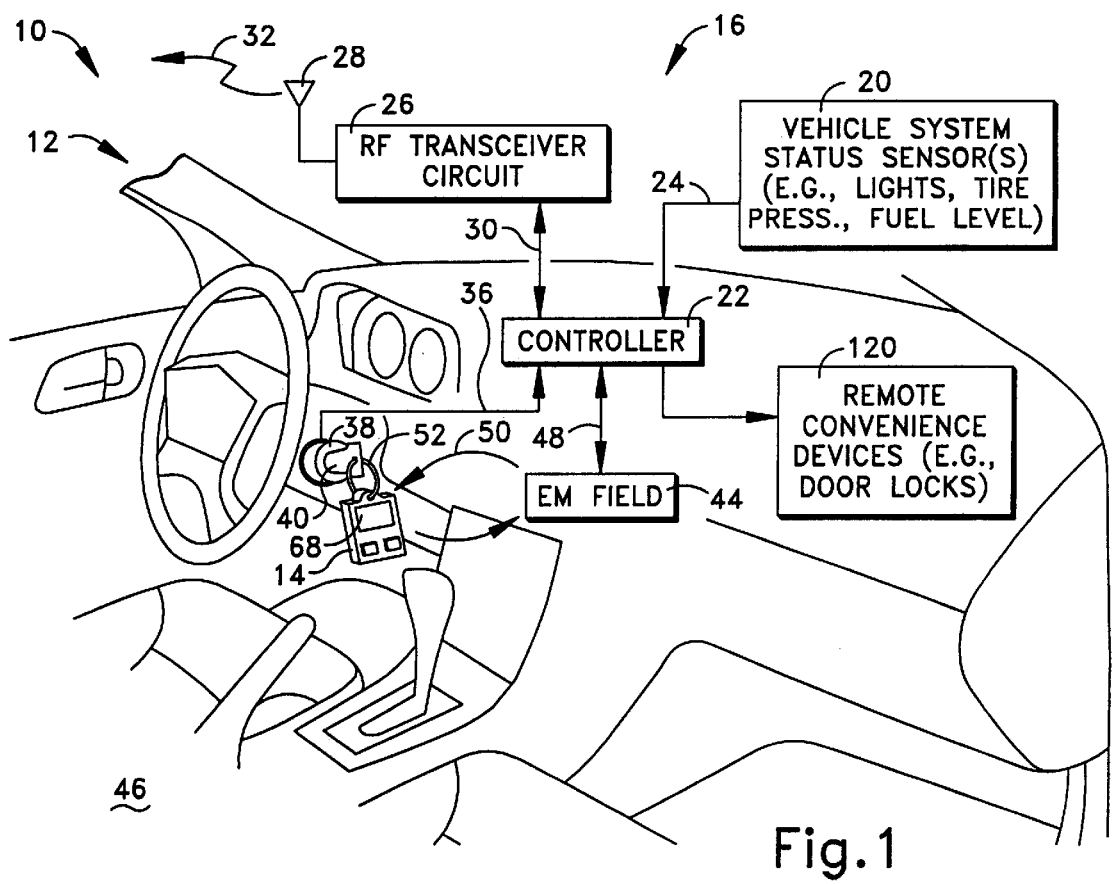
FIG. 1 is a schematic illustration of a system in accordance with the present invention, and an associated vehicle.

One embodiment of a system 10, in accordance with the present invention, is schematically shown in FIG. 1 along with an associated vehicle 12 (only partially shown). The system 10 includes a portable hand-held transceiver unit 14 (hereinafter referred to as "the portable unit") and a vehicle-based transceiver unit 16 (hereinafter referred to as "the vehicle-based unit") that function to establish a communication link from the vehicle-based unit to the portable unit. Vehicle system status information is conveyed from the vehicle-based unit 16 to the portable unit 14 such that a vehicle operator (not shown in FIG. 1) in possession of the portable unit can be informed of the vehicle system status. In particular, the information is conveyed to the portable unit 14 at a time when the operator has ceased operating the vehicle 12 and has left the vehicle.

The vehicle status information is preferably information that is useful to the operator when the operator has left the vehicle 12. Examples of the information conveyed via the system 10 include vehicle light status (e.g., ON/OFF), vehicle tire air pressure, and amount of fuel remaining in a vehicle fuel tank. It is contemplated that other information can be provided to the operator via the system 10 in accordance with the present invention. Examples of such other information include the status of door locks, status of an alarm system, and status of various vehicle fluid levels.

Turning to the vehicle-based unit 16, the unit includes one or more vehicle system status sensors 20. The sensor(s) 20 detect various vehicle conditions such as the condition of vehicle lights, pressure within the vehicle tires, and the amount of fuel within the vehicle fuel tank. The sensor(s) 20 are operatively connected to a controller 22 of the vehicle-based unit 16. Sensory signals 24 from the vehicle system status sensor(s) 20 are processed by the controller 22, and information that is to be communicated to the portable unit 14 is derived from the signals.

Preferably, the communication between the vehicle-based unit 16 and the portable unit 14 is via RF broadcast transmission. Accordingly, the vehicle-based unit 16 includes RF transceiver circuitry 26 and an associated antenna 28. The controller 22 is operatively connected 30 to the RF transceiver circuitry 26 and provides appropriate commands via signals to the RF transceiver circuitry. At an appropriate time (e.g., when the operator has ceased operating the vehicle 12 and has left the vehicle), the RF transceiver circuitry 26 excites the antenna 28 to emit an RF broadcast signal 32 that is intended to be received by the portable unit 14.

As noted above, the system 10 provides vehicle system status information to the portable unit 14 at a time when the vehicle occupant has ceased operation of the vehicle 12 and has left the vehicle. Thus, the system 10 includes structure for sensing a condition that is indicative of the vehicle operator leaving the vehicle 12 such that the vehicle-based unit 16 can transmit the RF signal 32 that conveys the vehicle status information. In the preferred embodiment, the controller 22 is operatively connected 36 to an ignition switch 38 of the vehicle 12. The connection 36 to the ignition switch 38 provides information to the controller 22 as to whether an ignition key 40 is located within the ignition switch. Typically, when the vehicle operator removes the ignition key 40 from the ignition switch 38, the operator is intending to exit the vehicle 12. Accordingly, the detected removal of the ignition key 40 from the ignition switch 38 is taken as being indicative of the vehicle operator leaving the vehicle 12.

It is contemplated that other conditions that are indicative of the vehicle operator leaving the vehicle 12 may be detected/sensed as an alternative, or in addition, to sensing the removal of the ignition key 40 from the ignition switch 38. Examples of such other conditions that can be sensed to provide an indication of the vehicle operator leaving the vehicle 12 include opening of a driver side door and the operator leaving a driver seat of the vehicle. A door switch (not shown) can be used to sense the door being opened. An occupant presence sensor (not shown) can be used to sense the operator physically leaving the driver seat. Examples of occupant presence sensors include a weight sensor located under the driver seat and an ultrasound or infrared sensor directed at the driver seat.

Figure 2:
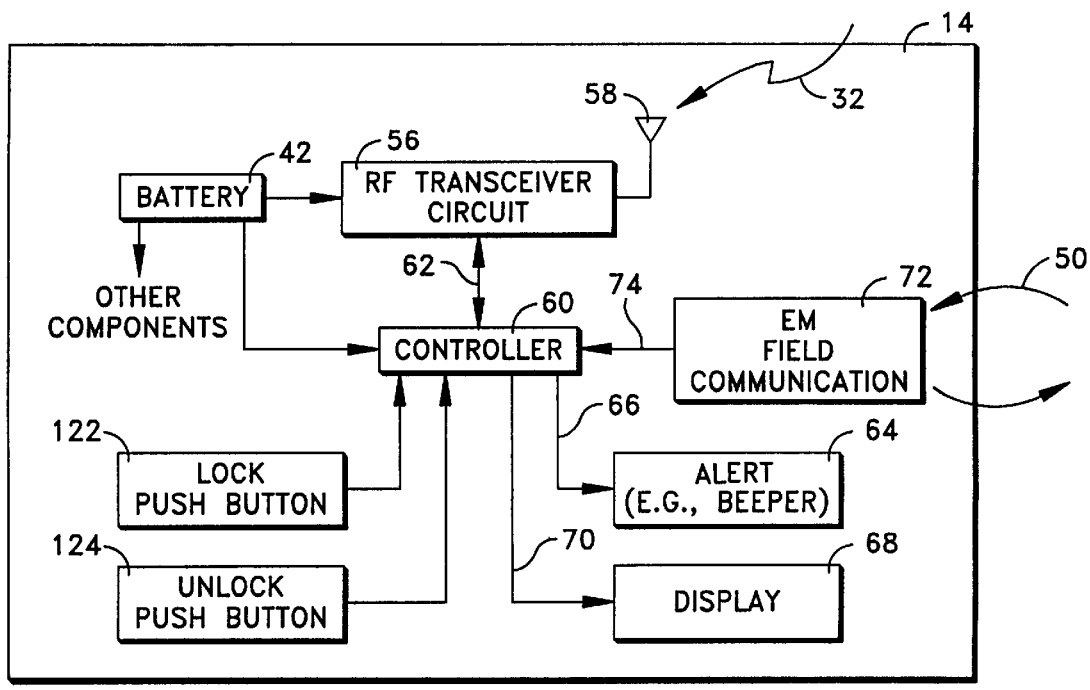
FIG. 2 is a block diagram of a portable unit of the system of FIG. 1.

It is to be appreciated that a relatively small onboard battery 42 (FIG. 2) powers the portable unit 14. Thus, it is advantageous for the portable unit 14 to avoid long time periods in an active RF reception mode (i.e., a state of waiting for the broadcast signal 32). Accordingly, the portable unit 14 can achieve a RF dormant or sleep mode to conserve battery power. Further, the portable unit 14 is preferably in the RF dormant mode for large time periods because the portable unit receives a transmitted vehicle status signal 32 only at the occasion of the vehicle operator leaving the vehicle 12.

The portable unit 14 is awoken from its dormant mode in order to be in the RF active reception mode when the vehicle status signal 32 is transmitted. The vehicle-based unit 16 (FIG. 1) includes structure 44 for interacting with the portable unit 14 to cause the portable unit to wake from the dormant mode. Specifically, the structure 44 of the vehicle-based unit 16 provides an indication to the portable unit 14 upon the detection of the condition that indicates the vehicle operator is exiting the vehicle 12.

The indication provided to the portable unit 14 is such that the portable unit can receive and react to the indication while the portable unit is in the RF dormant mode. Also, it is to be appreciated that the interaction with the portable unit 14 occurs when the portable unit is within (i.e., inside a vehicle occupant compartment 46) the vehicle 12 because the RF vehicle status signal 32 occurs upon exit of the vehicle operator and the portable unit from the vehicle. Preferably, the structure 44 of the vehicle-based unit 16 that perform such interaction with the portable unit 14 is an electromagnetic (EM) field communication device 44 that is operatively connected 48 to the controller 22.

The EM field device 44 outputs an EM field 50 that is intended to be perceived by the portable unit 14. In response to the perception of the EM field 50 by the portable unit 14, the portable unit will interpret the presence of the EM field as an indication that the portable unit is located within the vehicle 12 and that the exit of the vehicle operator from the vehicle may shortly occur. The controller 22 operates the EM field device 44 while the ignition key 40 is in the ignition switch 38.

Turning to the portable unit 14, the illustrated example of the portable unit is configured as a fob on a key ring 52 that is connected to the ignition key 40. Within the portable unit 14 (FIG. 2), RF transceiver circuitry 56 and an associated antenna 58 are provided. The antenna 58 receives the RF vehicle status signal 32 transmitted from the vehicle-based unit 16 and conveys an electrical signal to the RF transceiver circuitry.

A controller 60 of the portable unit 14 is operatively connected 62 to the RF transceiver circuitry 56. The RF transceiver circuitry 56 conveys the vehicle status information derived from the RF vehicle status signal 32 to the controller 60. A component 64 that alerts the operator that a RF vehicle status signal 32 is received at the portable unit 14 is operatively connected 66 to the controller 60. Examples of such an alert component 64 include a beeper, a light, and a buzzer.

A display 68 is operatively connected 70 to the controller 60. Preferably, the display 68 is a liquid crystal display. The controller 60 output signals to the display 68 such that indicia (e.g., alphanumeric characters) is provided on the display that indicates the information regarding the vehicle system status. The vehicle operator is alerted to the occurrence of the incoming status information via the alert component 64 (e.g., the beeper), and can view the information that is presented on the display 68.

An EM field communication device 72 is operatively connected 74 to the controller 60 to provide a signal to the controller that indicates the presence of the EM field 50 provided by the vehicle-based unit 16 and also indicates the cessation of the EM field 50. The signal from the EM field communication device 72 that indicates the cessation of the EM field 50 is interpreted by the controller 60 as a wake-up signal. In response to the cessation of the EM field 50, the controller 60 controls the RF transceiver circuitry 56 to power-up and await reception of the RF vehicle status signal 32.

Preferably, the EM interaction (i.e., the provision and perception of the EM field 50) that occurs between the vehicle-based unit 16 (FIG. 1) and the portable unit 14 is a passive on the part of the portable unit. Thus, battery drain at the portable unit 14 is minimized. Also, it is contemplated that EM interaction can provide sufficient power to the portable unit 14 to react to the EM interaction. In such a case, no battery power consumption occurs at the portable unit 14 during the EM interaction. As an additional feature regarding the EM field interaction between the vehicle-based unit 16 and the portable unit 14, it is contemplated that the portable unit may even response to the EM field device via imposition of a change in the EM field or a response EM field. The vehicle-based unit 16 would perceive the response and provide a signal to the controller 22 that indicates the response from the portable unit 14.

Figure 3:
FIG. 3 is an illustration of a portion of the system of FIG. 1 and shows an operational step for the system.
Figure 4:
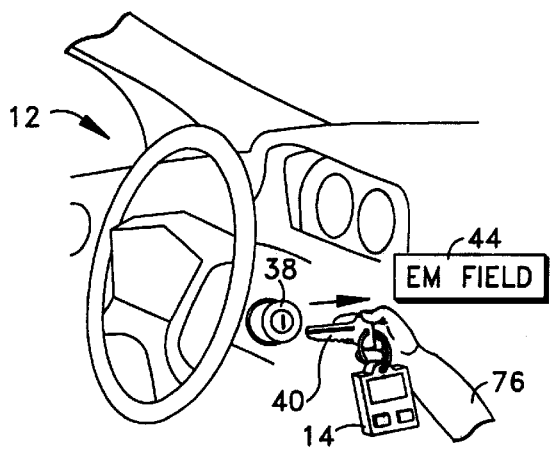
FIG. 4 is a view similar to FIG. 3, but shows another operational step for the system.
Figure 5:
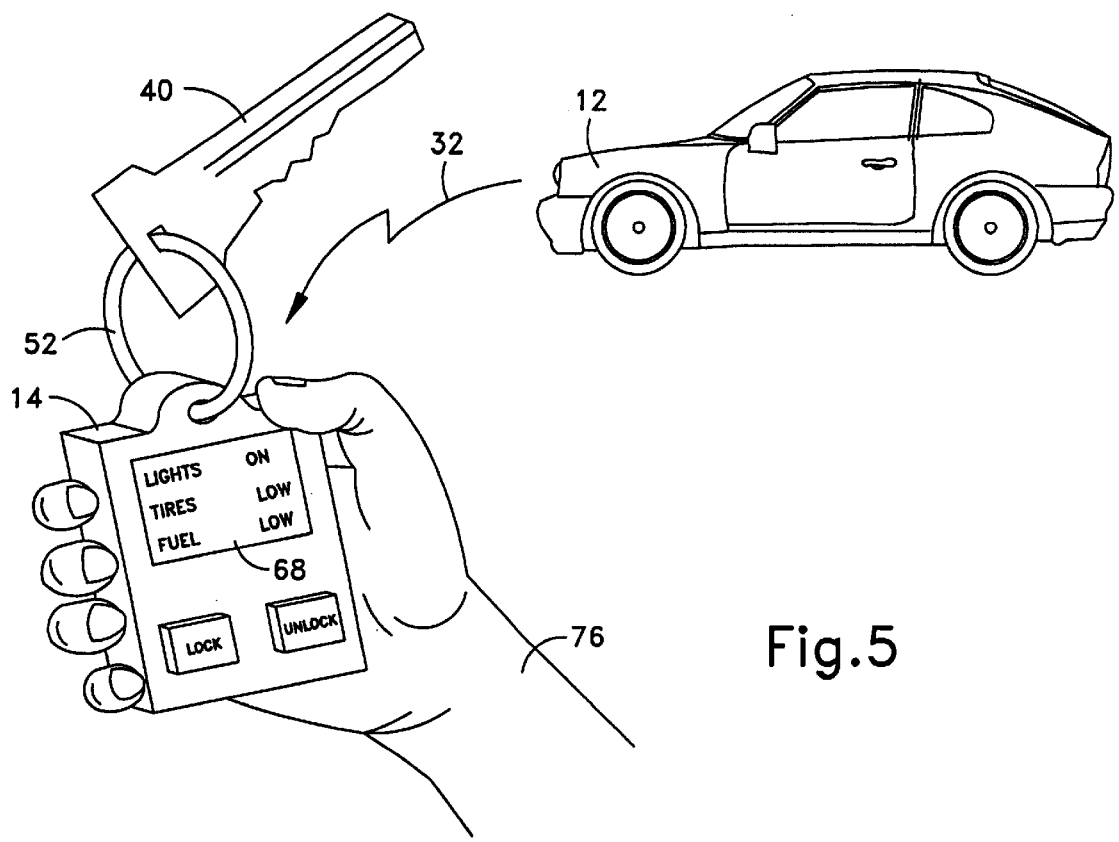
FIG. 5 is a pictorial illustration of the portable unit and the associated vehicle of FIG. 1, and shows yet another operational step for the system.

An example of operation of the system 10 is illustrated in FIGS. 3–5. It is to be understood that some components of the system 10 are not shown in FIGS. 3–5. FIG. 3 shows the ignition key 40 in the ignition switch 38, thus the portable unit 14 is within the vehicle 12. The EM field device 44 is engaged in the EM interaction with the portable unit 14, and the portable unit 14 is in the RF dormant mode.

In FIG. 4, a vehicle operator 76 (only the hand of the operator is shown) removes the ignition key 40 from the ignition switch 38 in preparation of the operator exiting the vehicle. In response to the removal of the ignition key 40 from the ignition switch 38, the EM field device 44 ceases the EM interaction. The portable unit 14 no longer perceives the EM field 50 and thus interprets the cessation of the EM field as a wake-up instruction. The portable unit 14 thus prepares to receive the RF vehicle status signal 32 from the vehicle-based unit 16.

Once the vehicle-based unit 16 has collected the vehicle system information, the vehicle-based unit broadcasts the RF vehicle status signal 32 (FIG. 5) that conveys the information. The now active portable unit 14 receives the vehicle status signal 32. In turn, the portable unit 14 alerts (e.g., via an audible beep sound from the alert component 64) the vehicle operator 76 of the received vehicle status signal 32 and provides the received information on the display 68.

Figure 6:
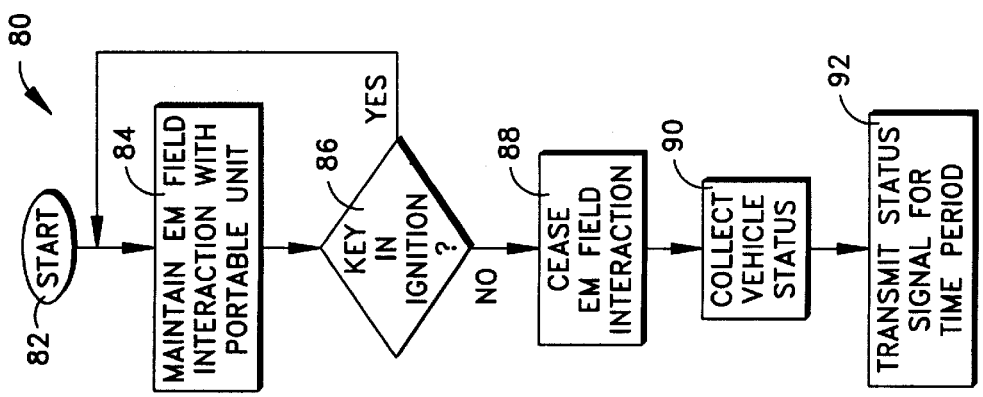
FIG. 6 is a flow chart for a process performed by a vehicle-based unit of the system.

An example of a process 80 performed within the vehicle-based unit is shown in FIG. 6. The process 80 begins at step 82 and proceeds to step 84. At step 84 the EM field interaction (i.e., provision of the EM field 50 by the EM field device 44) is maintained. At step 86, it is determined if the ignition key 40 is in the ignition switch 38.

If the determination at step 86 is affirmative (i.e., the ignition key 40 is in the ignition switch 38), the process 80 loops back to step 84. If the determination at step 86 is negative (i.e., the ignition key 40 is removed from the ignition switch 38), the process 80 goes to step 88.

At step 88, the EM field interaction is terminated. At step 90, the controller 22 collects the vehicle system information. At step 92, the vehicle status signal 32 containing the information is transmitted.

Figure 7:
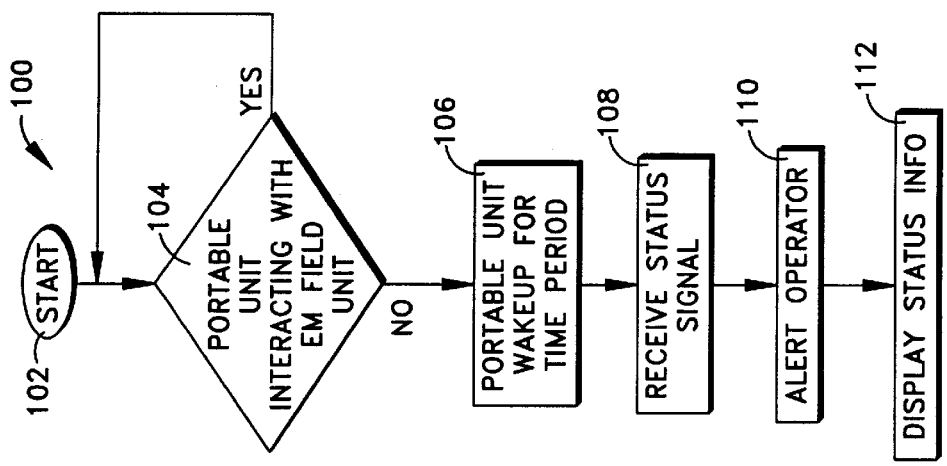
FIG. 7 is a flow chart for a process performed by the portable unit of the system.

An example of a process 100 performed within the portable unit 14 is shown in FIG. 7. The process 100 begins at step 102 and proceeds to step 104. At step 104, it is determined if the EM field interaction (i.e., provision of the EM field 50 by the EM field device 44) is occurring.

If the determination at step 104 is affirmative (i.e., the EM field 50 is present), the process 100 repeats step 104. If the determination at step 104 is negative (i.e., the EM field 50 is not present), the process 100 goes to step 106.

At step 106, the portable unit 14 awakes. At step 108, the vehicle status signal 32 containing the information is received. At step 110 the operator 76 is alerted (e.g., via audible beep). At the step 112, the information is presented on the display 68.

It is to be appreciated that the system 10 FIG. 1) is heretofore described with the vehicle-based unit 16 acting in the capacity of a RF transmitter and the portable unit acting in the capacity of a RF receiver. However, it is to be noted that the vehicle-based unit and the portable unit are preferably capable of bi-directional RF communication. Specifically note that the portable and vehicle-based units 14 and 16 contain RF transceiver circuitry 56 and 26, respectively.

Preferably, in addition to the provision of the information upon operator 76 exit from the vehicle 12 (described above), the system 10 also operates to provide remote control performance of convenience functions at the vehicle. The vehicle 12 has remote convenience devices 120 that are controlled by the controller 22. Examples of remote convenience devices 120 include a door lock, a truck latch, an alarm system, a power seat, a power window, a seat heater, and an engine starter. In the illustrated example, the remote convenience devices 120 are door locks.

The portable unit 14 (FIG. 2) includes at least one pushbutton switch (e.g., 122) that is associated with control of the remote convenience devices 120 at the vehicle 12, and that is operatively connected to the controller 60. In response to pushbutton actuation, a RF signal is transmitted from the portable unit 14 to the vehicle-base unit 16 to cause performance of the remotely requested function. In the illustrated embodiment, two pushbutton switches 122, 124 are provided. The first switch 122 is associated with the lock function and the second switch 124 is associated with the unlock function.

From the above description of the invention, those skilled in the art will perceive improvements, changes and modifications. Such improvements, changes and modifications within the skill of the art are intended to be covered by the appended claims.

Having described the invention, the following is claimed:

1. A system for a vehicle, said system comprising:
   transmitter means, located at the vehicle, operable for sending communication that conveys a vehicle system status;
   portable receiver means operable for receiving the communication that conveys the vehicle system status, an operator of the vehicle carrying said receiver means upon leaving the vehicle;
   means for sensing a condition indicative of the vehicle operator leaving the vehicle; and
   means for enabling the communication from said transmitter means to said receiver means in response to the sensed condition indicative of the vehicle operator leaving the vehicle.

2. A system as set forth in claim 1, including display means, associated with said portable receiver means, for displaying vehicle system status information conveyed via the communication and received by the portable receiver means.

3. A system as set forth in claim 1, including alert means, associated with said portable receiver means, for alerting the vehicle operator upon receipt by said portable receiver means of the communication conveying the vehicle system status information.

4. A system as set forth in claim 1, wherein the condition indicative of the vehicle operator leaving the vehicle is the removal of an ignition key from an ignition switch, said means for sensing includes means for sensing the removal of the ignition key from the ignition switch.

5. A system as set forth in claim 1, wherein said means for enabling communication includes means for causing operation of said transmitter means in response to the sensed condition indicative of the vehicle operator leaving the vehicle.

6. A system as set forth in claim 1, wherein said means for enabling communication includes means for enabling operation of said receiver means in response to the sensed condition indicative of the vehicle operator leaving the vehicle.

7. A system as set forth in claim 6, wherein said means for enabling operation of said receiver means includes a component, located at the vehicle, and a component, associated with the portable receiver means, that interact until the occurrence of the condition indicative of the vehicle operator leaving the vehicle.

8. A system as set forth in claim 7, wherein said components that interact until the occurrence of the condition indicative of the vehicle operator leaving the vehicle include components that interact via an electromagnetic field.

9. A system as set forth in claim 1, wherein said transmitter means is part of a vehicle-based transceiver means, said portable receiver means is part of a portable transceiver means, said portable transceiver means includes means operable for transmitting a remote convenience function request signal, and said vehicle-based transceiver means includes means for receiving the remote convenience function request signal and for causing performance of the requested remote convenience function request.

10. A system for a vehicle, said system comprising:

transmitter means, located at the vehicle, operable for transmitting a vehicle system status signal;

portable receiver means for receiving the transmitted vehicle system status signal, an operator of the vehicle carrying said receiver means upon leaving the vehicle;

means for sensing a condition indicative of the vehicle operator leaving the vehicle; and means for causing operation of said transmitter means in response to the sensed condition indicative of the vehicle operator leaving the vehicle.

11. A system as set forth in claim 10, including display means, associated with said portable receiver means, for displaying vehicle system status information conveyed via the communication and received by the portable receiver means.

12. A system as set forth in claim 10, including alert means, associated with said portable receiver means, for alerting the vehicle operator upon receipt by said portable receiver means of the communication conveying the vehicle system status information.

13. A system as set forth in claim 10, wherein the condition indicative of the vehicle operator leaving the vehicle is the removal of an ignition key from an ignition switch, said means for sensing includes means for sensing the removal of the ignition key from the ignition switch.

14. A system as set forth in claim 10, wherein said transmitter means is part of a vehicle-based transceiver means, said portable receiver means is part of a portable transceiver means, said portable transceiver means includes means operable for transmitting a remote convenience function request signal, and said vehicle-based transceiver means includes means for receiving the remote convenience function request signal and for causing performance of the requested remote convenience function request.

15. A system for a vehicle, said system comprising:

transmitter means, located at the vehicle, operable for transmitting a vehicle system status signal;

portable receiver means operable for receiving the transmitted vehicle system status signal, an operator of the vehicle carrying said receiver means upon leaving the vehicle;

means for sensing a condition indicative of the vehicle operator leaving the vehicle; and means for enabling operation of said receiver means in response to the sensed condition indicative of the vehicle operator leaving the vehicle.

16. A system as set forth in claim 15, including display means, associated with said portable receiver means, for displaying vehicle system status information conveyed via the communication and received by the portable receiver means.

17. A system as set forth in claim 15, including alert means, associated with said portable receiver means, for alerting the vehicle operator upon receipt by said portable receiver means of the communication conveying the vehicle system status information.

18. A system as set forth in claim 15, wherein the condition indicative of the vehicle operator leaving the vehicle is the removal of an ignition key from an ignition switch, said means for sensing includes means for sensing the removal of the ignition key from the ignition switch.

19. A system as set forth in claim 15, including means for causing operation of said transmitter means in response to the sensed condition indicative of the vehicle operator leaving the vehicle.

20. A system as set forth in claim 15, wherein said transmitter means is part of a vehicle-based transceiver means, said portable receiver means is part of a portable transceiver means, said portable transceiver means includes means operable for transmitting a remote convenience function request signal, and said vehicle-based transceiver means includes means for receiving the remote convenience function request signal and for causing performance of the requested remote convenience function request.

* * * * *